Jan. 3, 1956

A. W. VINCENT 2,729,706

CROSS-BAR SWITCH

Filed Oct. 6, 1952

INVENTOR.
ANDREW W. VINCENT

BY D. Clyde Jones
ATTORNEY

Patented Jan. 3, 1956

2,729,706

CROSS-BAR SWITCH

Andrew W. Vincent, Rochester, N. Y.

Application October 6, 1952, Serial No. 313,250

7 Claims. (Cl. 179—27.54)

This invention relates to a coordinate switch suitable for interconnecting telephone lines, radio and television circuits and the like.

The switch of the present invention is an improvement over that disclosed in applicant's copending application Serial No. 261,673 filed December 14, 1951, and incorporates novel means for allotting link bars for use.

For a clearer understanding of the invention reference is made to the drawings in which.

Figures 1, 2, 3, 4A, 4B, 5, 6:
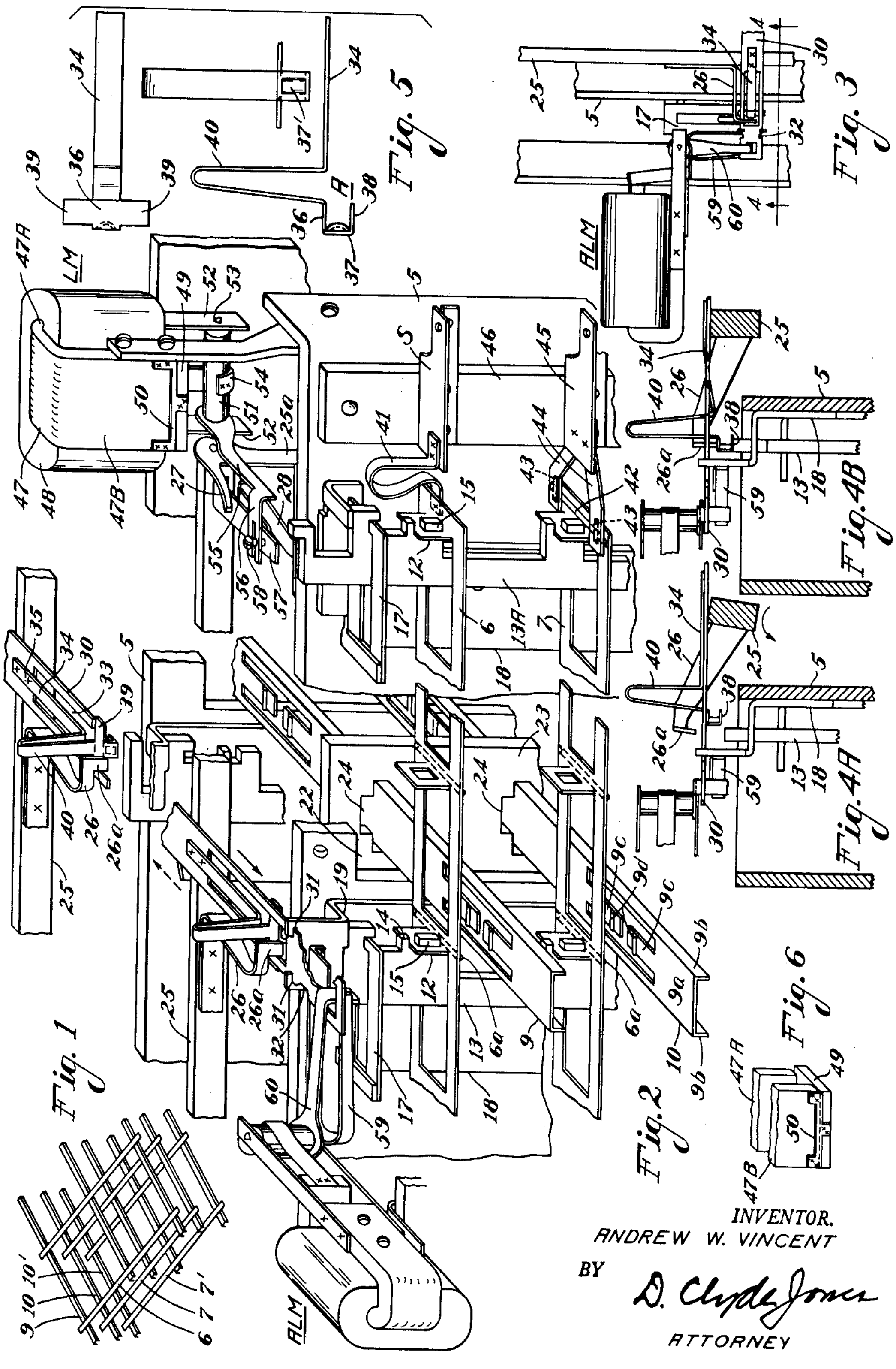
Fig. 1 is a diagrammatic showing of some of the connecting strips and connecting bars of the present cross-bar switch illustrating the coordinate arrangement of these parts.
Fig. 2 is a fragmentary isometric view of the novel crossbar switch.
Fig. 3 is a fragmentary plan view of the allotter magnet and related mechanism for actuating the allotting tape.
Figs. 4A and 4B are sectional views taken on the line 4—4 of Fig. 3, Fig. 4A showing the allotting tape as well as related parts in normal position and Fig. 4B showing these parts in operated position wherein the actuating unit is interposed between the top of a pusher and its rocking arm whereby the pusher has been depressed.
Fig. 5 illustrates a top view, an end view, and a side view, respectively, of a spring finger which includes the hairpin spring and which carries an actuating unit.
Fig. 6 is a fragmentary detail view of the mounting of the armature of a magnet suitable for use in the switch of this invention.

The present coordinate switch has wide application wherever a plurality of lines or circuits are to be selectively connected to a plurality of other lines or circuits. Although not limited thereto, the switch of this invention is particularly adapted for use in various types of telephone systems wherein it is desired to connect calling telephone lines to links or to connect links to other links or to connect links to wanted telephone lines.

In the present arrangement, like that of the mentioned patent application, a plurality of line plates, designated 5, are provided, of which only two are partially indicated in Fig. 2, the remainder of these plates being omitted to simplify the drawings. These plates are mounted in spaced parallel relation being secured at their ends on suitable frames (not shown). Each line plate, as illustrated in Fig. 2, carries a set of spaced electrically conducting parallel line or connecting strips or tapes 6 and 7 of thin resilient material arranged in a row in superimposed relation, and corresponding respectively to the several conductors of a telephone line or other circuit. A plurality of sets of link or connecting bars such as 9 and 10 arranged in superimposed rows, extend at right angles to the sets of line strips, to coöperate therewith as indicated in Fig. 1. It will be understood that the number of line or connecting strips in a set and the number of cooperating link or connecting bars in a set comprising a row, can be increased to six or more depending on the switching requirements to be satisfied by the switch. The strips 6 of the several line plates, extend in a first common plane, and their related connecting bars extend generally in a common plane parallel to but spaced slightly from said first plane. The strips 7 and their related connecting bars 10 are arranged in a manner similar to the strips 6 and bars 9.

Each line strip has portions thereof struck-out and formed with upstanding loops 12 (Fig. 2), one of which is provided at the point where a strip crosses each bar. Each loop 12 together with a limited portion of its line strip, is movable up and down by means of a pusher 13 of insulating material having spaced lugs 14 and 15 to receive therebetween a loop 12 which is supported on the lug 15. It will be understood that each pusher has sets of lugs 14 and 15 to receive and simultaneously operate the related loops 12 of the several line strips of a set such as 6 and 7. It should be mentioned that each line strip is sufficiently resilient so that a portion thereof adjacent an operated pusher 13 can be forced downward (Fig. 2) to make contact with a given link bar without causing substantial deflection of the remaining portion of the strip. Each pusher is supported on sets of spaced cantilever springs 17 (the top spring only being illustrated, Fig. 2) carried on a bracket plate such as 18, which, in turn, is mounted on the line plate 5. These springs tend to hold its related pusher 13 in its normal position against a fixed stop 19 (Fig. 2) on bracket 18, thereby insuring that each line strip is normally supported in a given plane at a plurality of points on its individual pushers, without any substantial sagging along its length.

Each line plate of the plurality of parallel line plates, has transverse windows 22 therein. Each window is covered by a sheet of rigid insulation 23 riveted to the plate and having several openings 24 therein arranged in a transversely extending row, the corresponding rows in the several line plates being in alinement. A row or set of link bars such as 9 and 10 corresponding to a single link, respectively extend through the sets of alined openings 24 in the insulation, covering the windows in the line plates, each link bar being supported on the insulation at an opening 24 therein, directly below the point where a line strip crosses it. Thus there are cross-overs for each link bar at each of the sets of line strips.

Each link bar such as 9 (Fig. 2) is channel-shaped, comprising a web 9*a* and two side flanges 9*b*, which rest on the insulation at each opening 24. The web of the link bar at each of its related openings, has portions thereof struck out to provide a pair of elongated resilient fingers 9*c*, 9*c* directed toward each other to extend in the direction of the main axis of its link bar. Each finger has welded thereto, a transversely extending bar contactor 9*d* of precious metal or other suitable contact metal to cooperate with a precious metal bar contactor, such as 6*a*, welded to its related line strip 6 to extend transversely thereof. Thus when a line strip is depressed in the manner to be described, the contactor thereon engages the twin contactors on a pair of spring fingers on a link bar. These fingers can bend independently of each other to afford twin contact action.

In order to operate selectively the pushers 13 on each line plate, there is provided a rigid rocking line shaft 25 rotatably mounted in supports 25*a* to extend along the upper edge (Fig. 2) of its individual line plate. The shaft has secured thereto, a plurality of projecting arms 26, one for each pusher 13, corresponding to each link. Each arm is made of sheet material of the shape shown in Fig. 2 and is substantially rigid in the direction of its rotary path of travel, so that it is not distorted while it is moving its related pusher. The end 26*a* of arm 26 as it swings through its given arc of travel, terminates just short of the adjacent end of its individual pusher 13 so that this pusher is not moved thereby until a box-like actuator unit A (Fig. 5) to be described, is interposed between the free end 26*a* of the arm and the adjacent end of its pusher Fig. 4B. Under this last-mentioned condition, the pusher is moved until its related line contactors 6*a* engage the related link contactors 9*d*, with ample contact force. A line magnet LM and related means individual to each line shaft 25, rocks this shaft away from the stop 27 against the action of a restoring spring 28 so that the arms 26 thereon, rotate through their given arcs of travel in which they do not operate their related pushers unless an allotted actuator unit A is interposed between the free end of a rocking arm and the end of its related pusher as shown in Fig. 4B.

In the switch of the present invention, an idle link comprising a set of link bars such as 9 and 10, is preferably allotted or preselected for the use of any one of the several lines. The means for allotting a set a link bars includes a light tape 30 which is operated and restored under the action of its allotter magnet ALM and spring 59. This tape has a considerable degree of resilience and is mounted to slide lengthwise, parallel to and in the direction of its individual set of link bars 9. The edges of each tape are received in and retained in opposing guide recesses 31 in the top portion of the brackets 18 related to a set of link bars.

It will be noted that the tape has side notches 32 struck therefrom in the region of each bracket to facilitate inserting the edges of the tape into the guide recesses, in the course of assembling the switch. However these notches, during normal use of the switch are so positioned that while the tape is operated through its normal range of movement, the notches do not register with the guide recesses in the bracket. Thus the edges of the tape are securely retained in the guide recesses during use. The tape is provided with a plurality of spaced elongated cut-outs 33 extending lengthwise of the tape, each of which cut-outs is located adjacent a line plate. The tape is also provided above each cut-out (Fig. 2) with a cantilever spring finger 34 carrying an actuator unit A to be interposed between the end 26*a* of arm 26 and the adjacent end of its related pusher as in Fig. 4B. The spring finger 34, which is preferably made of hardened beryllium copper, has one end thereof welded at 35 to the tape 30 adjacent one end of a cut-out therein, to extend lengthwise over a substantial part of the cut-out. The free end of the spring finger at the underside thereof, is formed into a rectangular actuator unit A provided with a top 36, a vertical side 37 and a bottom 38, the remaining sides being left open. The vertical side 37 is in the form of a vertical reinforcing corrugation embossing 37′ projecting into the box unit to prevent it from collapsing when its top is engaged by the rocking arm and when its bottom engages the adjacent end of a related pusher 13, to move the same against the action of its restoring spring 17. The unit A is thus subjected to compression forces only. The spring finger 34 has a hair-pin spring bend 40 therein near the box or actuator unit A. This hair-pin bend 40 enbales the finger to be stretched lengthwise so that the actuating box or unit can be retained between the top of its pusher and its related rocking arm when the allotting tape is restored in the direction of the broken arrow (Fig. 2), in the course of the operation of the switch as will be described. It will be noted (Fig. 5) that the top of the actuator unit A has lateral extensions 39 which span its related cut-out 33 in the tape and normally are spring urged against the underside of the tape (Fig. 2) by the resilience of the finger 34 which bends as a beam to insure a given normal horizontal position of its actuator unit. The hair-pin bend 40 also enables the spring finger 34 to be compressed in the event that the actuator unit A encounters the side 26*a* of a depressed arm 26 as may occur in the course of the operation of the switch. This arrangement insures that the oscillation of the box actuator A will be quickly damped out at the time when it is released by the rocking arm 26.

The speed at which the box is moved into position is controlled by three factors. The first factor is the time constant of the magnetic circuit of the allotter magnet ALM, which retards the build-up of flux. The structure of the box is small and therefore has small mass and consequently a relatively short time constant. The second factor is the mass of the tape assembly as a whole and the force applied thereto. This controls the acceleration of the tape assembly, the mass of the tape assembly being very low. The third factor is the mass of the box A and the stiffness of the hairpin spring 40, both of which control the speed of movement of the box in relation to the speed of the tape. When the mass of the box is low and the stiffness of the spring is high the natural period of vibration is high and the box will follow the motion of the tape closely. However, it is necessary that the stiffness of the hairpin be relatively low so as not to require a large deflecting force during operation.

By the use of hardened spring material and corrugation or embossing in the box, very thin spring material may be used which reduces the mass of the box considerably while maintaining the ability to carry the compression forces necessary to operate the pusher. A high period of oscillation is thus achieved mainly by reducing the mass, since the stiffness is controlled. The action of the box A in spring tension against the underside of the tape is important both as a locating device to guide the box between the finger and its pusher and as a damping system to quickly absorb stored energy in the spring upon release of the box. It is also significant that the frictional force of the box against the tape tends to move the box as the tape moves, thereby aiding the acceleration of the box. In this last respect it is also significant that no work is done in moving or deflecting the box or spring until an engagement is made.

The portion of the switch thus far described, is suitable for general switching purposes. When however it is to be used in a telephone system, such as is disclosed in applicant's companion application, Serial No. 326,112, filed December 15, 1952, it is desirable to provide mechanism effective when a line is in use to cut off the call-initiating equipment of that line, which equipment is similar in function to the conventional line relay and cut-off relay of a telephone line. This mechanism comprises a pusher 13A (Fig. 2) mounted for operation in a manner similar to that of the pushers 13 already described. In this instance, the connecting strip 6 while supported on the pusher 13A, is permanently connected by a flexible conductor 41 to the terminal S corresponding to the hold or sleeve conductor of a telephone line. The connecting strips corresponding to the tip and ring conductors of a telephone line, of which only connecting strip 7 is illustrated, are supported on and terminate at the pusher 13A. The terminating end of each of these strips is provided with a transverse contactor 42 of precious metal or other suitable contact material. Each contactor is normally in engagement with the twin contactors 43 carried on the resilient, forked ends 44 of a related line terminal 45 connected to one side of a telephone line. The terminals may be suitably mounted on a strip of insulation 46 which, in turn, is carried on a line plate. Thus, when a telephone line has originated a call or is called and its line magnet LM is operated, the call initiating equipment of the line is cut-off and the connection is maintained over strip 6. The pusher 13A is depressed by its related line magnet LM at the same time that this magnet rotates the shaft, to depress a pusher 13 for connecting a calling strip to an allotted link bar.

The line magnet LM and its related means for operating the shaft 25 and pusher 13A may be constructed in various ways but the novel design herein disclosed, is preferred. This magnet comprises a U-shaped iron bar 47 on one of the legs 47A of which a magnetizing coil 48 is mounted. An armature 49 (Fig. 6) is pivoted on a leaf hinge 50 to the other leg 47B of the bar, and has a length to bridge the free ends of the two legs thereby completing the magnetic circuit of the magnet. This magnet has an exceedingly narrow air gap so that the magnet develops large force without the use of an abnormal amount of power. Due to the extremely narrow air gap of the magnet, the armature 49 has a very small movement. It therefore, becomes necessary to multiply this movement, in order to satisfactorily operate the parts actuated by the magnet LM. This multiplication of movement is effected in the following manner. A stub shaft 51 preferably in axial alinement with shaft 25 is mounted for rocking movement in the spaced supports 52 carried by the leg 47A. The ends 53 of the shaft 51 are made with knife edges which engage V-shaped bearings in the free ends of the supports 52. A metal tape 54 has one of its ends welded to armature 49 and has its other end partially wrapped around the shaft 51 to which it is welded. The shaft has secured thereto a radial arm 55 provided with an angular extension 56. This arrangement is such that a relative small movement of the armature is translated into a relative large movement of the arm 55 and its extension 56. The extension projects in operative relation to the end of pusher 13A so that when the magnet LM is energized, the extension will depress this pusher 13A.

It has been mentioned that the magnet LM also rotates the shaft 25. This is preferably effected in the manner best shown in Fig. 2. The shaft 25 has a radial arm 57 projecting into the path of movement of the extension 56 to be swung thereby. A spring 28 attached to bracket 25A and to arm 55, normally biases this arm to rest against stop 27. The bracket and the stop may be integral and mounted on the related line plate. A set screw 58 threaded into the extension 56 against arm 57 on the shaft 25, permits adjustment of the amount of rotation of shaft 25 which rotation is caused by the stub shaft 51.

The allotter magnet ALM is preferably of the same construction as the line magnet LM. However, the corresponding radial arm 60 similar to arm 55 engages an aperture in one end of the tape 30 to move the tape in the direction of the solid arrow (Fig. 2) on energization of the allotter magnet and spring 59 serves to move the tape in the reverse direction when this magnet releases, as indicated by the broken line arrow.

In the operation of the present switch a set of link or connecting bars such as 9 and 10, is always allotted in readiness for use in extending a calling line. Let it be assumed that the link illustrated in Fig. 2 has been so allotted. Under this assumption the allotter magnet ALM draws the tape 30 in the direction of the full line arrow. This movement of tape 30 advances all of the actuating units or boxes A, which are individual to a connecting bar or link, to the position indicated in Fig. 4B.

When a connection is to be extended from a set of line strips 6, 7, the line magnet LM will be operated to rock the shaft 25 to swing its projecting fingers 26. In the course of the downward movement of the finger 26, the free end 26*a* thereof will engage the actuator unit or box A which is superimposed on its related pusher 13 of a calling line. This moves the pusher 13 to force the contacts on its respective strips into engagement with the contacts on the respective connecting bars. When the allotter magnet ALM is released on the seizure of a link represented by the bars 9 and 10, the tape 30 is moved in the direction of the broken line arrow. This moves all of the actuator units A of a given tape out of the end 26*a* of the related rocking arm 26. However the actuator A individual to the calling line is retained between the rocking arm 26 and pusher 13 individual to this line as long as the line magnet LM thereof is energized (Fig. 4*B*). During this period the hairpin spring 40 associated with the calling line is opened or extended to permit tape 30 to be restored in the direction of the broken line arrow. The line magnet LM of the calling line, when energized, also operates the pusher 13A to disconnect the call initiating equipment which functions for the same purpose as the line relay of conventional lines. This pusher and its related mechanism eliminate the need for the conventional cut-off relays. When the line magnet LM of the calling line is released on the termination of the call, the operated actuating unit A individual to the calling line, is restored by its hairpin spring 40 to the position shown in Fig. 4A. Also when the calling line magnet is released, the pusher 13A is restored to its normal position wherein the call-initiating equipment of this telephone line is reconnected thereto.

What I claim is:

1. In an interconnecting switch, spaced sets of parallel primary members extending in one direction, spaced sets of parallel secondary members coordinately arranged in operative cross-over relation with respect to said primary members to extend in a second direction, the members of one set being rigid, a pusher at each cross-over movable to cooperate in effecting electrical engagement between a primary element and a secondary element thereat, a plurality of movable elements each common to a group of pushers, each element at the limit of its forward movement being spaced from its related puhsers, means for operating an element, allotting means for preselecting for use a pusher in each group, said means comprising a lengthwise movable part common to a pusher in each group, said part having a portion mounted thereon for each pusher in its group and moved in the same direction with said part into the space between its related pusher and its related movable element whereby movement of the element in cooperation with one of said portions will operate the related pusher, and means for operating said part.

2. In an interconnecting switch, spaced parallel rigid bars of electrically conducting material extending in one direction, spaced parallel, transversely resilient strips of electrically conducting material coordinately arranged in operative cross-over relation with respect to said bars to extend in a second direction, a pusher at each cross-over movable to deflect a portion of the strip thereat into electrical engagement with the related bar, a plurality of movable shafts each individual to a group of pushers related to a strip, elements on each shaft, each element of a shaft being individual to one of the pushers of a strip, each element at the limit of its forward movement being spaced from its related pusher, and allotting means for preselecting for use a pusher in each group, said means comprising a lengthwise movable tape common to a pusher in each group, said tape having an actuator unit resiliently mounted thereon for each pusher in the group and movable in the same direction with the tape into the space between its related pusher and its related element whereby movement of an element in cooperation with one of said actuator units will operate the related pusher, and means for operating said tapes selectively.

3. An interconnecting switch as defined in claim 2 wherein each tape has elongated cut-outs therein extending along the main axis of the tape, one of said cutouts being adjacent each pusher, an extensible resilient spring finger mounted at one of its ends on the tape adjacent one end of each cut-out to extend in the direction of the main axis of the tape, the free end of each finger projecting through its related cut-out, an actuator on the free end of its finger adapted on advance movement of the tape to be interposed between a related element and pusher.

4. An interconnecting switch as defined in claim 2 wherein each tape has elongated cut-outs therein extending along the main axis of the tape, one of said cutouts being adjacent each pusher, a resilient spring finger mounted at one of its ends on the tape adjacent one end of each cut-out to extend in the direction of the main axis of the tape, the free end of each finger projecting through its related cut-out, an actuator on the free end of its finger adapted on advance movement of the tape to be interposed between a related element and pusher, said spring finger having a hairpin bend therein rendering it extensible lengthwise.

5. An interconnecting switch as defined in claim 2 wherein each tape has elongated cut-outs therein extending along the main axis of the tape, one of said cutouts being adjacent each pusher, an extensible resilient spring finger mounted at one of its ends on the tape adjacent one end of each cut-out to extend in the direction of the main axis of the tape, the free end of each finger projecting through its related cut-out, an actuator on the free end of its finger adapted on advance movement of tape to be interposed between a related element and pusher, said actuator being hollow and having at least one reinforcing corrugation therein whereby the actuator has reduced mass and superior strength.

6. An interconnecting switch as defined in claim 2 wherein each tape has elongated cut-outs therein extending along the main axis of the tape, one of said cutouts being adjacent each pusher, an extensible resilient spring finger mounted at one of its ends on the tape adjacent one end of each cut-out to extend in the direction of the main axis of the tape, the free end of each finger projecting through its related cut-out, an actuator on the free end of its finger adapted on advance movement of tape to be interposed between a related element and pusher, and stop members on the free end of the spring finger bridging the related cut-out whereby the actuator is retained at one surface of the tape.

7. An interconnecting switch as defined in claim 2 wherein each tape has elongated cut-outs therein extending along the main axis of the tape, one of said cutouts being adjacent each pusher, an extensible resilient spring finger mounted at one of its ends on the tape adjacent one end of each cut-out to extend in the direction of the main axis of the tape, the free end of each finger projecting through its related cut-out, an actuator on the free end of its finger adapted on advance movement of tape to be interposed between a related element and pusher and to be subjected thereby to compression forces only, said actuator being hollow and having at least one reinforcing corrugation therein whereby the actuator has reduced mass and superior strength.

References Cited in the file of this patent

UNITED STATES PATENTS 2,517,022 Peek ------------------ Aug. 1, 1950